(12) United States Patent
Park et al.

(10) Patent No.: US 10,477,612 B2
(45) Date of Patent: Nov. 12, 2019

(54) METHOD FOR ACCESSING A NETWORK BY USING A VIRTUAL UE SCHEME

(71) Applicant: LG ELECTRONICS INC., Seoul (KR)

(72) Inventors: Kungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/738,765

(22) PCT Filed: Jan. 22, 2016

(86) PCT No.: PCT/KR2016/000729
§ 371 (c)(1),
(2) Date: Dec. 21, 2017

(87) PCT Pub. No.: WO2016/208837
PCT Pub. Date: Dec. 29, 2016

(65) Prior Publication Data
US 2018/0192466 A1    Jul. 5, 2018

Related U.S. Application Data

(60) Provisional application No. 62/184,912, filed on Jun. 26, 2015.

(51) Int. Cl.
*H04W 76/25* (2018.01)
*H04W 76/15* (2018.01)
(Continued)

(52) U.S. Cl.
CPC ......... *H04W 76/25* (2018.02); *H04L 41/0866* (2013.01); *H04L 41/0893* (2013.01);
(Continued)

(58) Field of Classification Search
CPC combination set(s) only.
See application file for complete search history.

(56) References Cited

U.S. PATENT DOCUMENTS

2010/0216479 A1    8/2010  Kato et al.
2010/0234071 A1*   9/2010  Shabtay ............... H04B 7/0408
                                                   455/562.1
(Continued)

FOREIGN PATENT DOCUMENTS

GB    2484922 A    5/2012
JP    2013546244 A    12/2013
(Continued)

*Primary Examiner* — Hicham B Foud
(74) *Attorney, Agent, or Firm* — Dentons US LLP

(57) ABSTRACT

A method of accessing a network by using a virtual UE scheme and a UE thereto are disclosed. The method includes performing a first random access procedure for a first DU group including one or more DUs with respect to a base station, performing a second random access procedure for a second DU group with respect to the base station, while maintaining a connection of the first DU group with the base station, and communicating with the base station via the first DU group and the second DU group.

7 Claims, 14 Drawing Sheets

(51) Int. Cl.
*H04W 74/08* (2009.01)
*H04L 12/24* (2006.01)
*H04W 72/04* (2009.01)
*H04W 4/06* (2009.01)
*H04W 48/16* (2009.01)
*H04W 48/14* (2009.01)
*H04W 8/26* (2009.01)
*H04W 88/06* (2009.01)
*H04W 88/08* (2009.01)
*H04W 4/40* (2018.01)
*H04W 84/00* (2009.01)

(52) U.S. Cl.
CPC ............ *H04W 4/06* (2013.01); *H04W 48/14* (2013.01); *H04W 48/16* (2013.01); *H04W 72/0413* (2013.01); *H04W 74/0833* (2013.01); *H04W 76/15* (2018.02); *H04W 4/40* (2018.02); *H04W 8/26* (2013.01); *H04W 84/005* (2013.01); *H04W 88/06* (2013.01); *H04W 88/08* (2013.01)

(56) References Cited

U.S. PATENT DOCUMENTS

| | | |
|---|---|---|
| 2012/0184306 A1 | 7/2012 | Zou et al. |
| 2013/0163484 A1 | 6/2013 | Ihm et al. |
| 2013/0188534 A1 | 7/2013 | Baldemair et al. |
| 2013/0223356 A1 | 8/2013 | Khoshnevis |
| 2013/0331057 A1 | 12/2013 | Kodali et al. |
| 2014/0003329 A1 | 1/2014 | Chen |
| 2014/0003377 A1 | 1/2014 | Park et al. |
| 2014/0016534 A1 | 1/2014 | Kim et al. |
| 2014/0153534 A1 | 6/2014 | Kim et al. |
| 2015/0334748 A1* | 11/2015 | Yu .................. H04L 1/1812 370/328 |

FOREIGN PATENT DOCUMENTS

| | | |
|---|---|---|
| JP | 2015508943 A | 3/2015 |
| WO | 2014167073 A2 | 10/2014 |

\* cited by examiner

[Fig. 1]
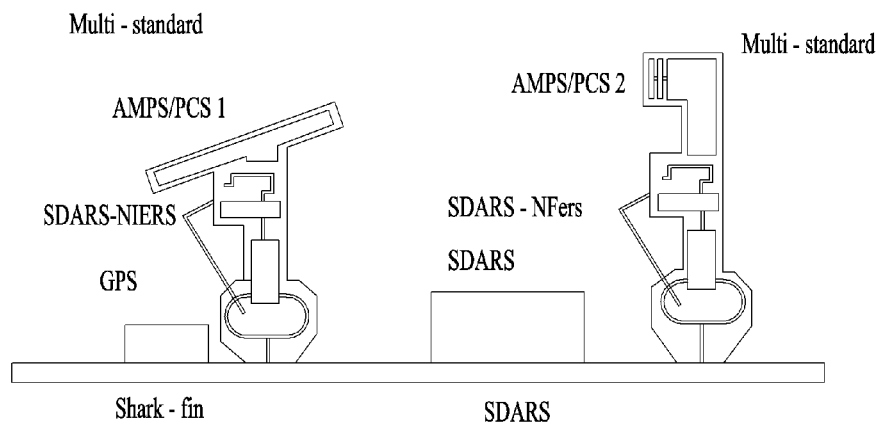
[Fig. 2]
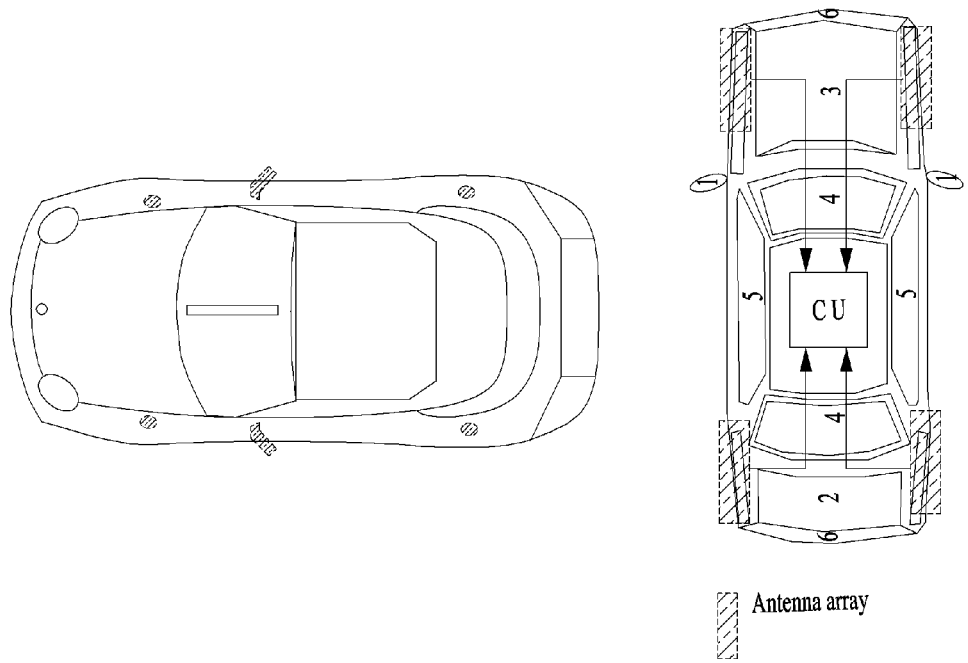

[Fig. 3]
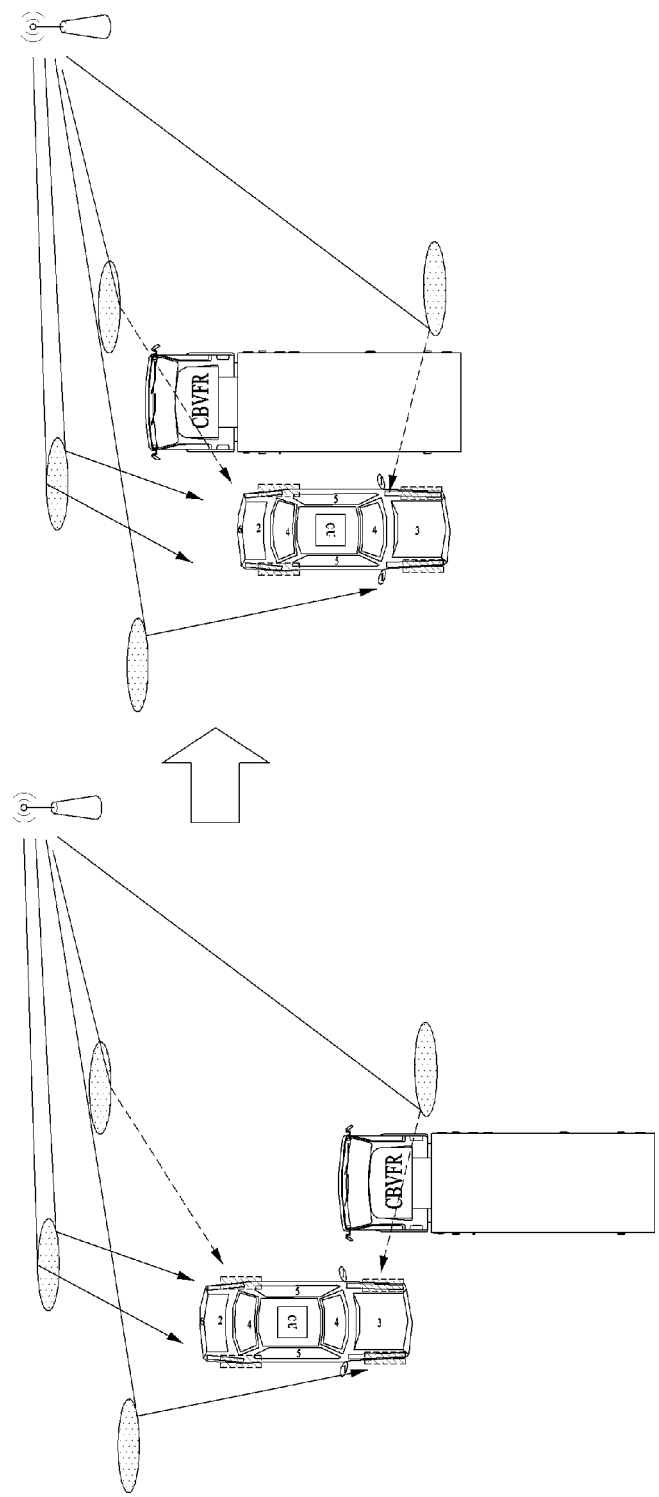

[Fig. 4]
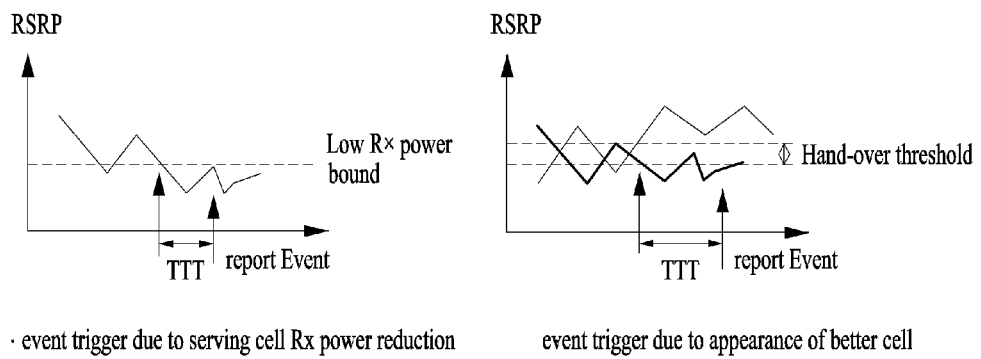
· event trigger due to serving cell Rx power reduction    event trigger due to appearance of better cell
[Fig. 5]
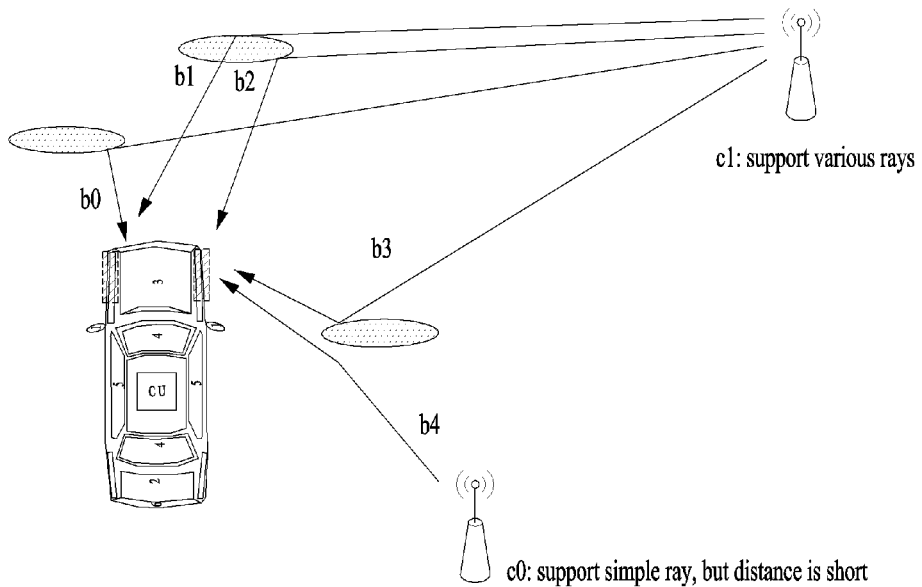

[Fig. 6]
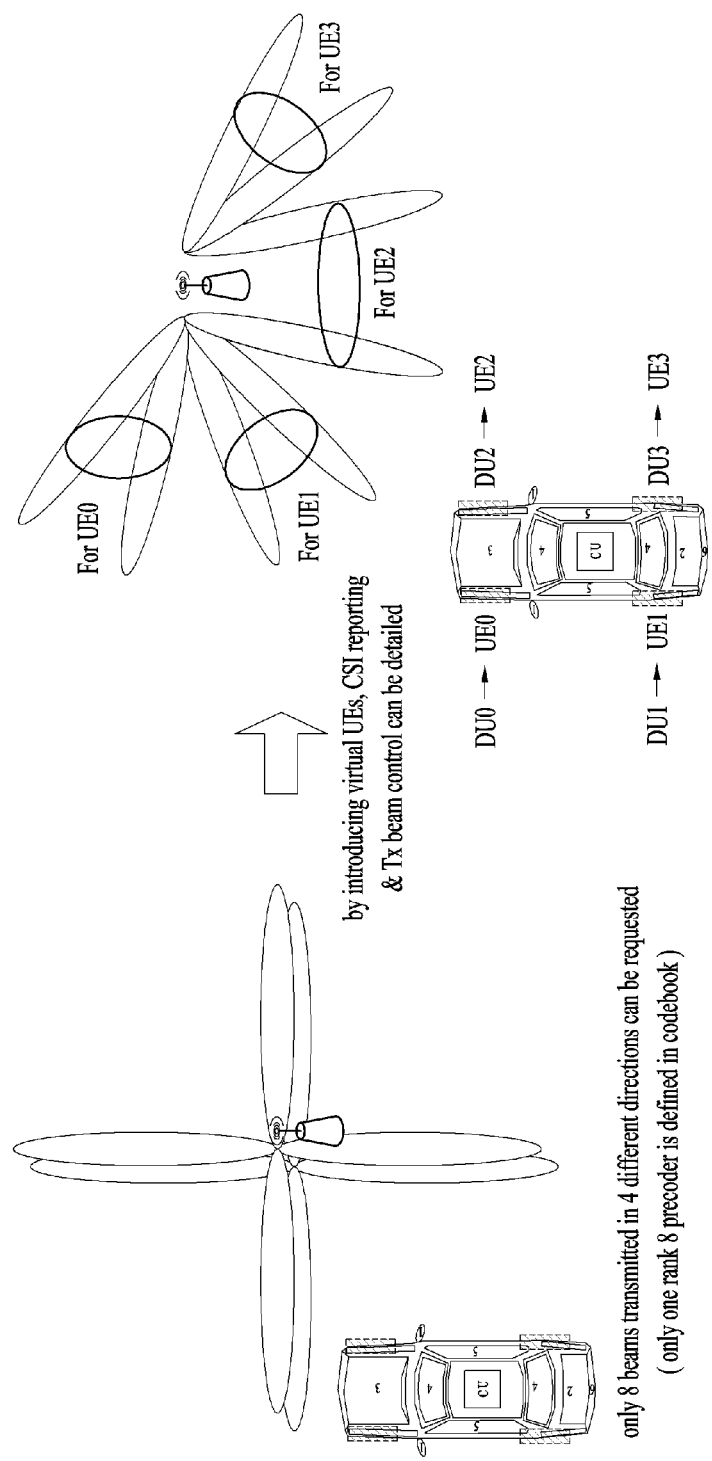

[Fig. 7]
| UE ID | corresponding DU (sub-array) | UE IDs |
|---|---|---|
| ID 0 (RNTI #1) | all DUs | default UE ID recognized by all entry of network |
| ID 1 (RNTI #2) | DU 1 | virtual UE ID |
| ID 2 (RNTI #3) | DU 2 | virtual UE ID |
| ID 3 (RNTI #4) | DU 3 & DU 4 | virtual UE ID |
| ID 4 (RNTI #5) | DU 1 & DU 2 | virtual UE ID |
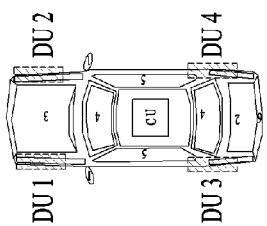

[Fig. 8]
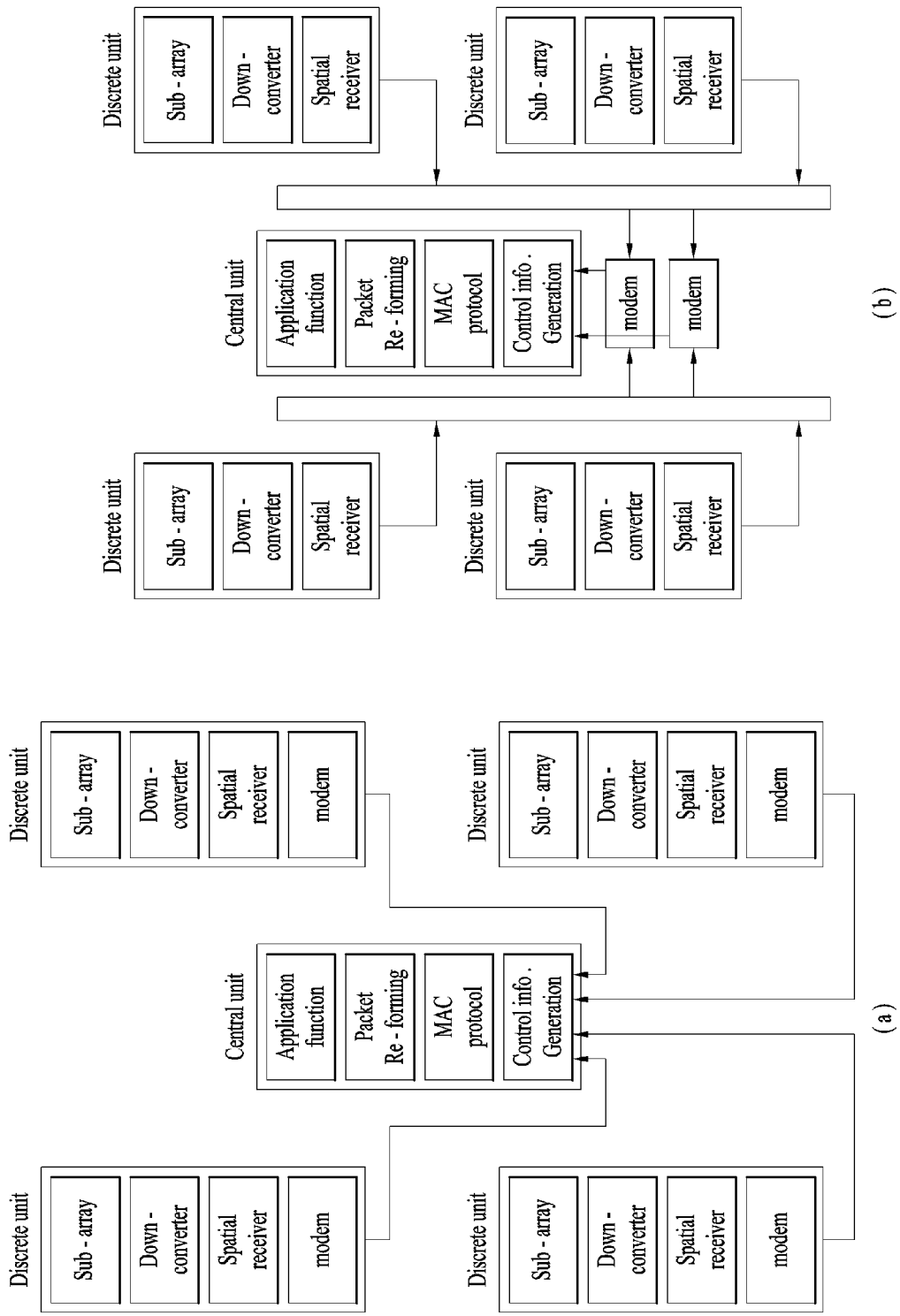

[Fig. 9]
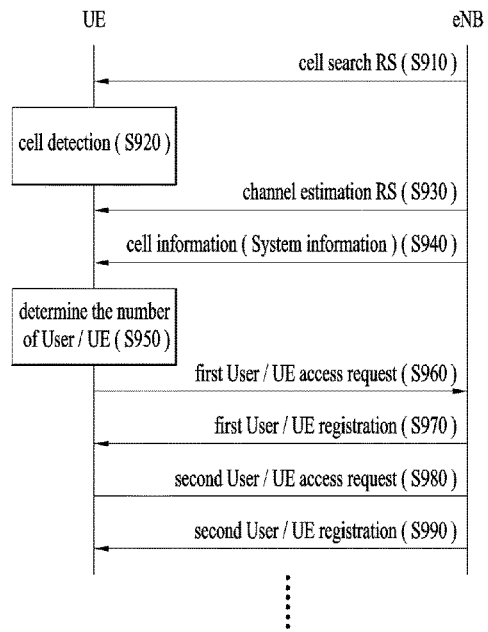
[Fig. 10]
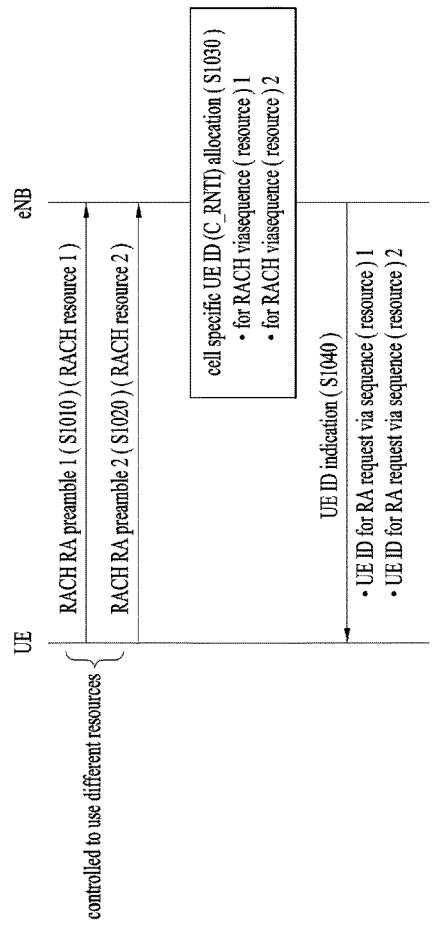

[Fig. 11]
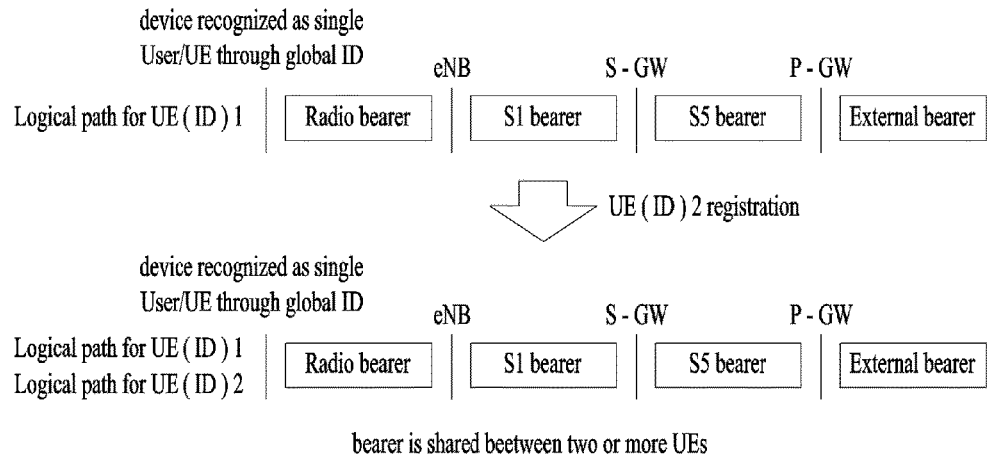
[Fig. 12a]
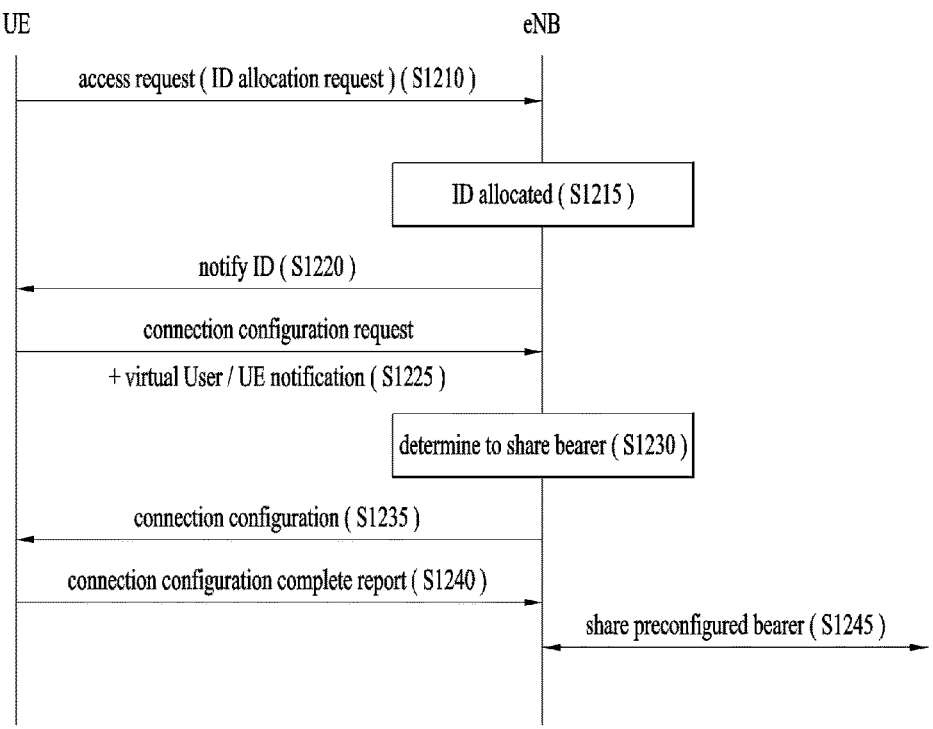

[Fig. 12b]
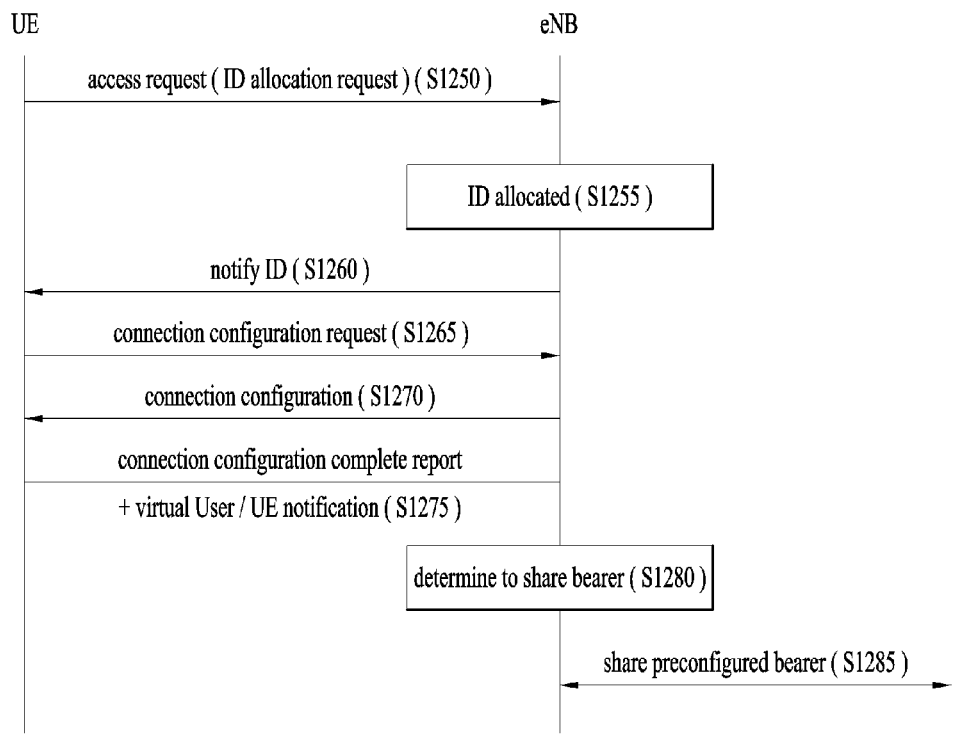

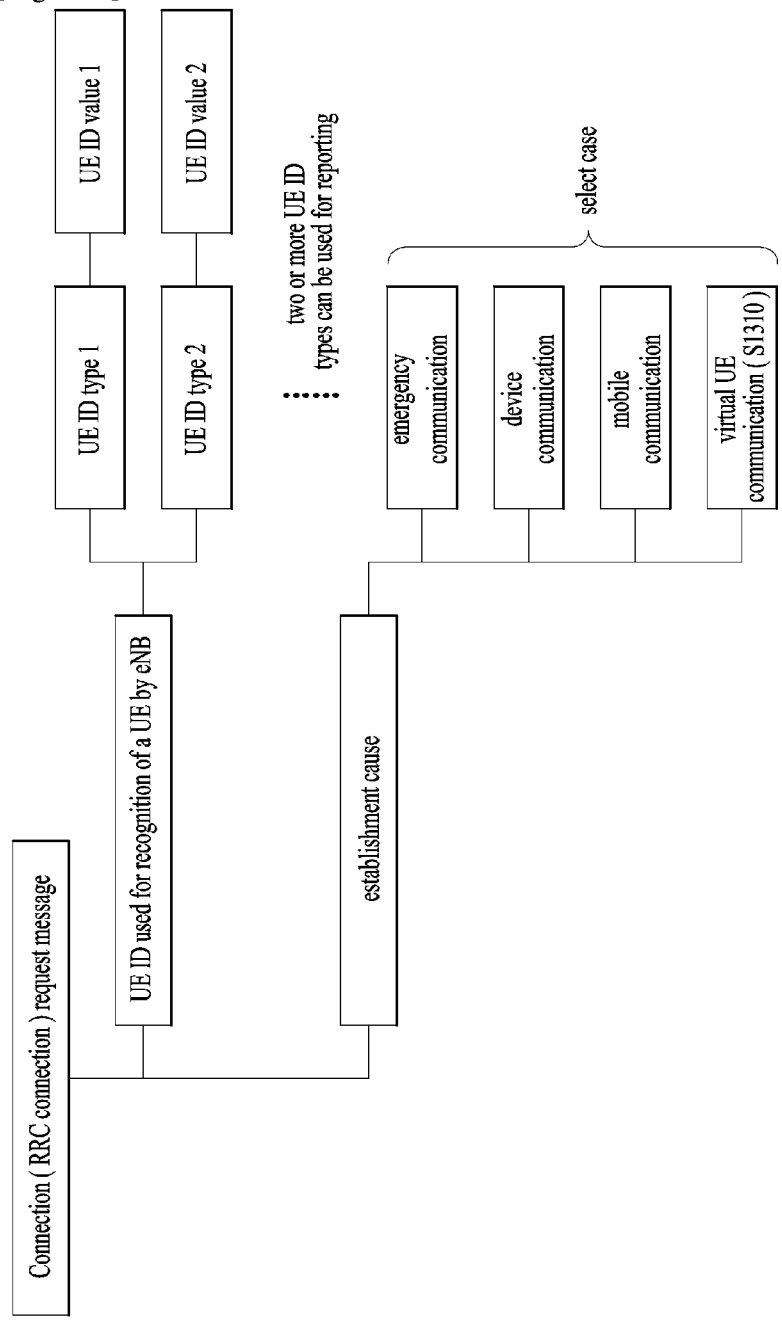

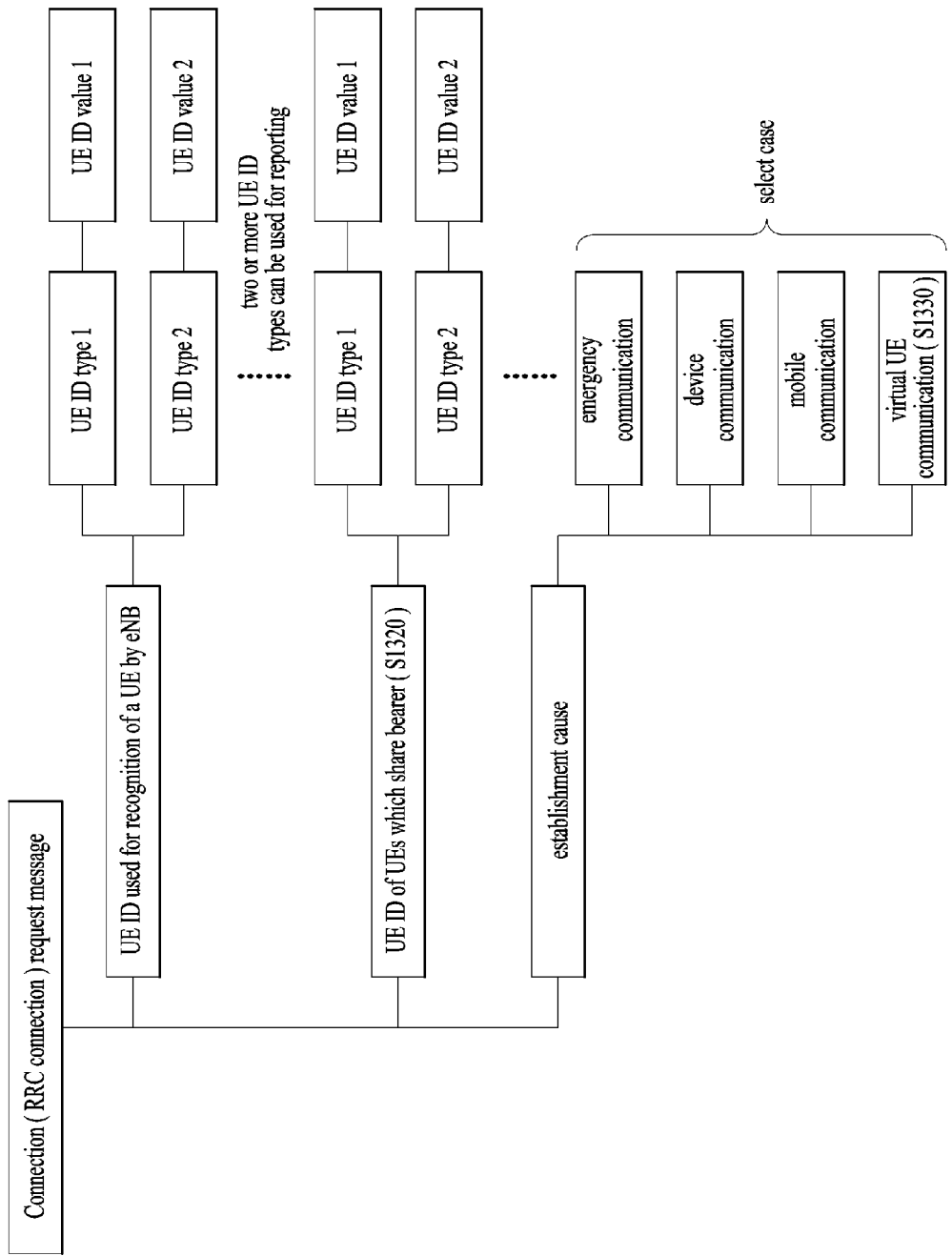
[Fig. 13b]

[Fig. 13c]
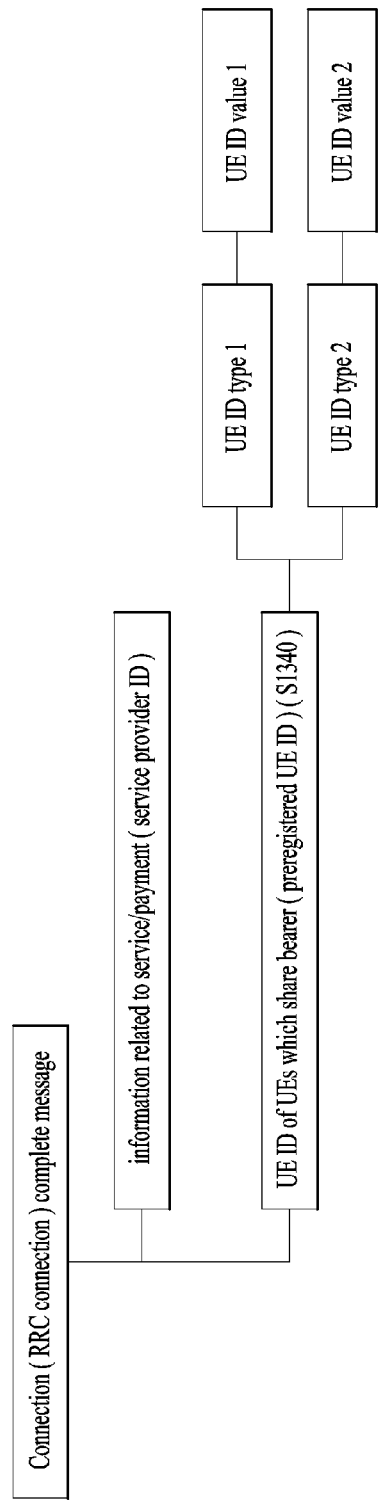

[Fig. 13d]
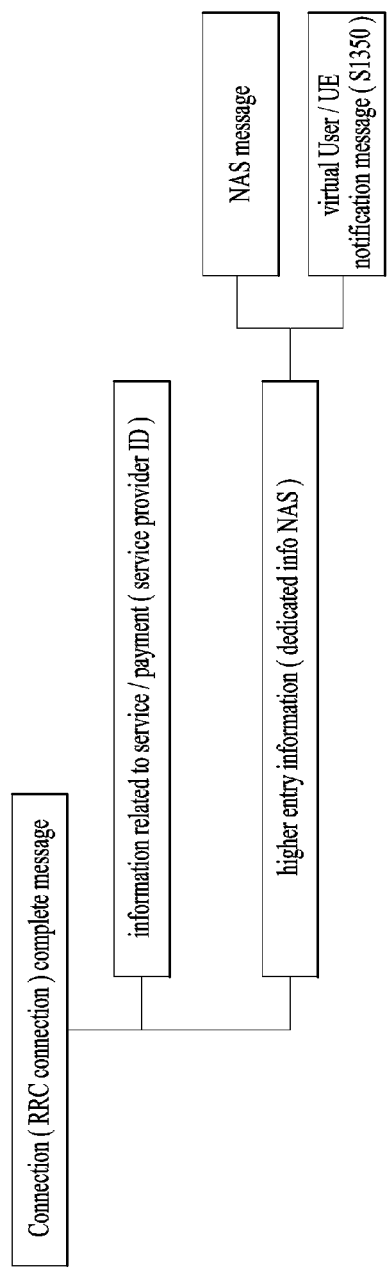

[Fig. 14]
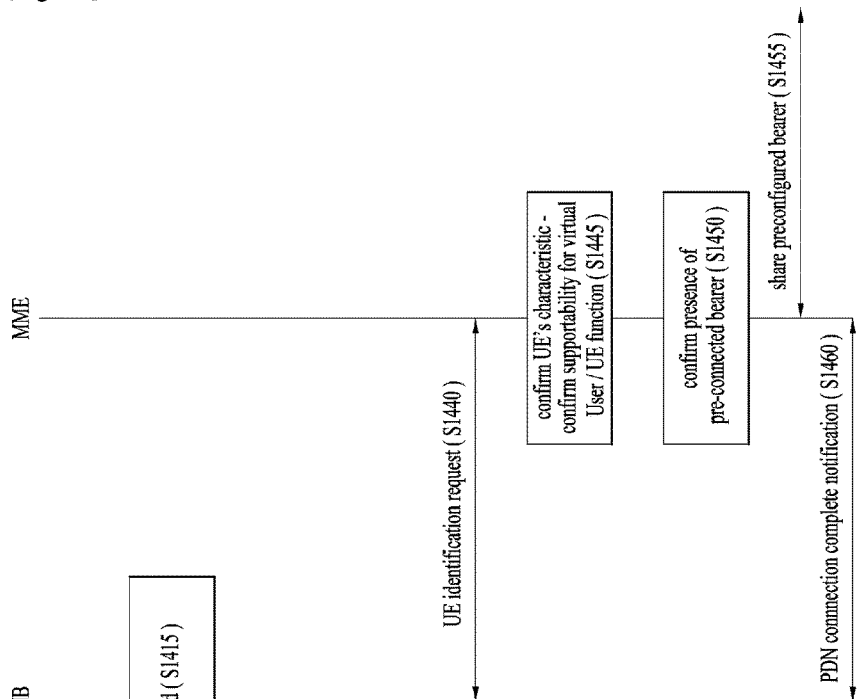
[Fig. 15]
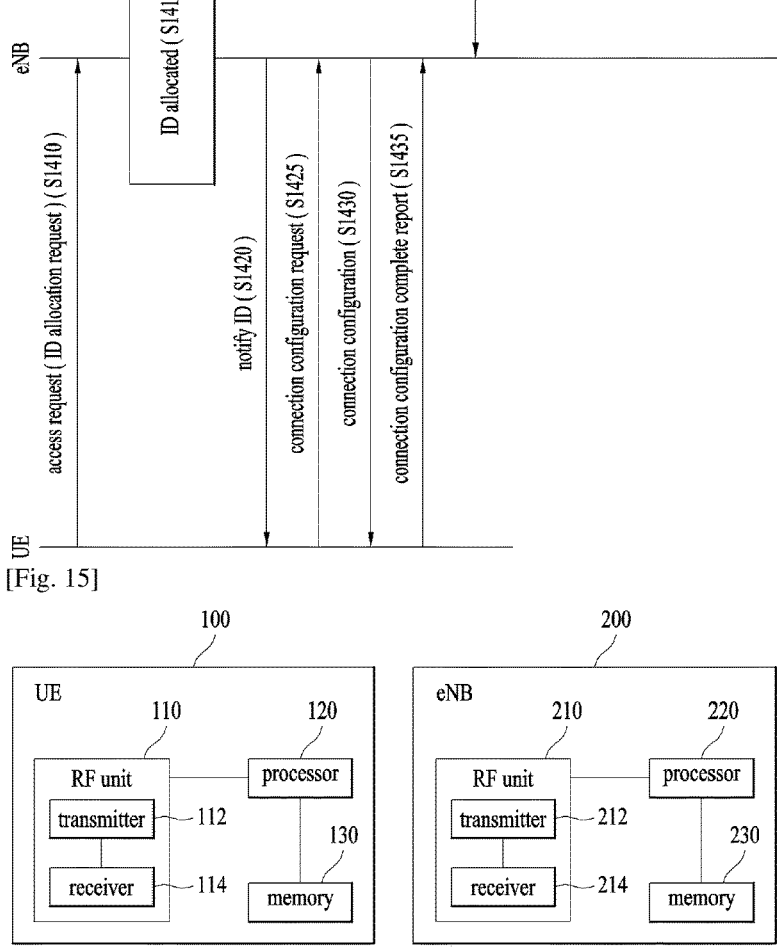

METHOD FOR ACCESSING A NETWORK BY USING A VIRTUAL UE SCHEME

This application is a 35 USC § 371 National Stage entry of International Application No. PCT/KR2016/000729, filed on Jan. 22, 2016, and claims priority to U.S. Provisional Application No. 62/184,912, filed Jun. 26, 2015, all of which are incorporated by reference in their entirety herein.

TECHNICAL FIELD

The present invention relates to a method for accessing a network of a device by using a virtual UE scheme and a device thereto. Specifically, network access procedure of a device is disclosed in a system of distributed antenna system (DAS).

BACKGROUND ART

In a conventional mobile communication system, services for personal mobile communication device occupy most of data traffic. Since required data rate & quality of service (QoS) are inverse proportional to mobility of the mobile device, current communication system offers services with good quality for a mobile device with low mobility and offers services with stability without link failures for a mobile device with high mobility.

As frequency of use of wireless communication and criteria of usage of wireless communication increase, needs of providing high data rate & high QoS for a user with high mobility increase. For example, a plurality of users in a public transportation may want to watch multimedia contents while the transportation, or a plurality of passengers in personal vehicle which is driving in a highway may use different wireless communication services. In the above-mentioned cases, mobile communication system should be able to provide wireless services with good quality for the users with high mobility.

It is a new model which is not present in current wireless communication model. To support this, mobile communication network needs to be enhanced to a level of revolution or a new system to implement the new model without any influence to current network infrastructures should be configured.

There is a discussion about V2X (Vehicle to Infra/Vehicle/Nomadic) communication technic to support efficient communication for users in vehicles. V2X includes a communication between vehicle to infrastructure (V2I) and a communication between vehicle to vehicle (V2V).

When a large size of an antenna aray is installed outside vehicle and is operated to provide high quality service to a high speed moving vehicle, aesthetic problems and aerodynamic problems can be raised. Thus, a study of an antenna array for vehicles is needed.

DISCLOSURE OF INVENTION

Technical Problem

The present invention is devised to solve the aforementioned general technical problem. One object of the present invention is to provide high throughput in vehicle communication system.

Another object of the present invention is to enhance communication efficiency without deteriorating design value and/or aerodynamic performance of a vehicle.

The other object of the present invention is to adaptively controlling network connections of the distributed antennas while maintaining compatibility with a current communication system standards.

Technical tasks obtainable from the present invention are non-limited the above mentioned technical tasks. And, other unmentioned technical tasks can be clearly understood from the following description by those having ordinary skill in the technical field to which the present invention pertains.

Solution to Problem

To achieve these and other advantages and in accordance with the purpose of the present invention, as embodied and broadly described, according to one embodiment, a method of accessing a network, by using a virtual user equipment (UE) scheme, includes performing a first random access procedure for a first distributed unit (DU) group including one or more DUs with respect to a base station, performing a second random access procedure for a second DU group with respect to the base station, while maintaining a connection of the first DU group with the base station, and communicating with the base station via the first DU group and the second DU group.

The first random access procedure and the second random access procedure may be performed by using two different random access preamble sequences respectively.

The two different random access preamble sequences may be selected randomly among a plurality of available sequences, or a first random access preamble sequence is selected randomly among the plurality of available sequences and a second random access preamble sequence may be selected by adding a predetermined value to an index for the first random access preamble sequence.

The method may further comprise receiving a message notifying two different UE IDs allocated for the first DU group and the second DU group respectively.

The first DU group and the second DU group may be separately identified by the base station and be identified as one subject by a upper network entry.

One single bearer may be shared between the first DU group and the second DU group.

The second random access procedure may comprise transmitting a connection request message including information indicating the virtual UE scheme.

The first DU group may be a substantial UE (SUE) according to the virtual UE scheme and the second DU group may be a virtual UE (VUE) according to the virtual UE scheme.

The one or more DUs may be distributed from each other over a vehicle and be connected to a central unit (CU).

To further achieve these and other advantages and in accordance with the purpose of the present invention, as embodied and broadly described, according to a different embodiment, a UE accessing a network by using a virtual UE scheme, includes a transmitter, a receiver, and a processor configured to control the transmitter and the receiver, wherein the processor is configured to perform a first random access procedure for a first distributed unit (DU) group including one or more DUs with respect to a base station, to perform a second random access procedure for a second DU group with respect to the base station, while maintaining a connection of the first DU group with the base station, and to communicate with the base station via the first DU group and the second DU group.

Advantageous Effects of Invention

Accordingly, the present invention provides the following effects or advantages.

First of all, as higher rank communication and simultanoues multiple codewords transmission are available, high communication throughput can be obtained without effecting conventional network configurations.

Secondly, it is able to accomplish enhanced communication performance without deteriorating vehicle design and aerodynamic performance of the vehicle.

To support the vehicle with high rank transmission by using virtual UE scheme without enfluencing operation of current mobile communication system supporting conventional devices, network registration of VUEs and communication process via VUEs which are not effecting conventional network configurations are described.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

FIG. 1 illustartes a structure of a shark antenna.

FIG. 2 illustrates an example of a distributed antenna system (DAS) considered in the present invention.

FIG. 3 illustrates advantages of the distributed antenna system when ray-blocks are present.

FIG. 4 illustrates a diagram of Radio Resource Monitoring (RRM) measurement scheme for selecting eNB/cell.

FIG. 5 illustrates a problem of traditional cell selection method based on Rx power and also illustrates one exemplary embodiment of cell selection method according to the present invention.

FIG. 6 is a diagram of detailed Tx beam control by introducing virtual User Equipment (VUE).

FIG. 7 shows an exemplary embodiment of defining a plurality of virtual UEs and corresponding UE IDs.

FIG. 8 is a block diagram of a device supporting a virtual UE scheme.

FIGS. 9 and 10 show exemplary embodiments of method for accessing a network by using virtual UE scheme of a device.

FIG. 11 is a diagram for a bearer configuration when a virtual UE scheme is applied.

FIGS. 12A and 12B show exemplary embodiments of method for accessing a network by using virtual UE scheme of a device.

FIGS. 13A, 13B, 13C and 14D show exemplary embodiments of message configurations when virtual UE scheme is applied.

FIG. 14 shows exemplary embodiments of method for accessing a network by using virtual UE scheme of a device.

FIG. 15 is a block diagram for a user equipment and a eNB in accordance with the present invention.

BEST MODE FOR CARRYING OUT THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

1. Distributed Antenna System (DAS)

Vehicular MIMO (Multi-Input Multi-Output) system which includes large-size antenna array installed in vehicle to provide good quality services in high-mobility moving situations through large array gain and relays received data from central unit of a vehicle to in-vehicle passengers is considered to provided efficient vehicle communication as mentioned above.

When the large size array antenna is installed outside vehicle, a reduction in communication performance can be prevented which has an average value about 20 dB due to penetration loss. Further, large array gain can be obtained by using more antennas than personal portable communication devices, and Rx diversity can also be easily obtained since the antennas exists with large distances.

By the above-mentioned features, communication services can be provided with relatively good quality without additional investments in infrastructures. Despite these advantages, the large antenna array has never installed outside vehicles. It is not easy to install the large antenna array outside vehicles since vehicles are expensive assets than personal communication devices, are not easy to enhance & upgrade, and require design concept, aerodynamic structure, etc. To remove visual discomfort of antenna arrays, vehicle manufacturers use combinational antenna which has worse performance than single antenna.

FIG. 1 illustrates a structure of a shark antenna.

As can be seen from FIG. 1, a shark antenna consists of 4 or more antennas supporting different bandwidth/services. But, the shark antenna is not enough to provide high quality communications, since the shark antenna has worse performance than single antenna, as said before.

Thus, embodiments of the present invention consider distributed antenna array system (DAS) which implements arrayed antenna system with a plurality of antennas, not a single antenna to solve the problem of shark antenna and the space constraints of large antenna array.

FIG. 2 illustrates an example of a distributed antenna system (DAS) considered in the present invention.

The antennas with radiation patterns in accordance with the variety of shapes and their mounted positions are distributed throughout the vehicle. And, as shown in FIG. 2, a central unit (CU) can be installed to integrately control transceiving signals through the antennas. From the structure of FIG. 2, Rx diversity can be maximized by using antenna arrays. And radio connection between the base station (or eNB) and the vehicle can be prevented from being cut off in situations with a high-speed mobile communication environment changes rapidly, through a cooperation among the receiving antennas with a different radiation patterns.

The antenna unit which is deployed in a distributed way like FIG. 2 can be called distributed unit (DU). Hereinafter, a 'DU' refers to an antenna sub-array or an antenna unit.

FIG. 3 illustrates advantages of the distributed antenna system when ray-blocks are present. FIG. 3 shows the reason why the DAS has advantageous in preventing link failures compared to traditional antenna array. In vehicle communications, when an obstacle (e.g., large size vehicle, such as a truck) moves with similar speed to the vehicle and Rx signal is received from the obstacle-presenting side, there might be communication failure for a relatively long time period.

However, with DAS shown in FIG. 3, Rx signals received from the network can have a plurality of different paths, thereby communication failure problem caused by the obstacle can be solved.

In FIG. 3, network end device which transmits signals to UEs in vehicles can be an eNB of conventional communication system, a roadside device installed to support vehicle communication. And, as shown in FIG. 3, the signal from network end device can be transmitted to the UEs in vehicles directly, or in a reflected-way by certain objects.

Likely said before, DAS has advantageous in securing link stability and thus DAS is very proper to be applied in vehicle to support high data rate. However, DAS structure should be installed with lossless cable between the antennas and the CU. When each of the distributed antennas or sub-array antenna (i.e., DU) receives RF band signal and simply transmits the received signal to CU, high frequency band cable which can share RF bnad signals should be installed between the Dus and CU. However, a cost for the high frequency band cable is high and sensitive to physical stimulation, such as movement, shock. Further, it is very complex and hard to restore the cable when a failure occurs in the cable.

To solve the problems, independently operating modems can be installed with each of the DUs, or a part of receiving procedures can be independently performed in each of the DUs and baseband signal, soft values, digitally processed signals can be shared between the DUs and the CU.

2. Cell Selection in DAS

As described, DAS is a proper array solution for a communication system for vehicles to overcome communication performance reduction in case of a ray-block and link failure occurrence. And, receiving power gain can be enhanced through large array antenna in DAS. However, to obtain practical gain in mobile communication system through the antenna structure, proper access management method should also be applied. Conventional access managing scheme using a singla antenna array in personal communication device is a scheme that selecting the best eNB by comparing received power of cell search reference signals from each of eNBs. Richness of rays to prevent degradation in performance due to ray-blocks and comparing received diversity gains can not be provided in the conventional access managing scheme.

FIG. 4 illustrates a diagram of Radio Resource Monitoring (RRM) measurement scheme for selecting eNB/cell.

To request an eNB/cell change to serving eNB by a UE, 'event' notifying the eNB/cell change is needed should be triggered. The 'event' is triggered when 1) received power of cell search reference signal from the serving cell is lower than a predetermined value and access point change to another eNB/cell is required to be considered, 2) cell search reference signal from another cell is received with higher power than the signal from the serving cell for a predeterined time period and thus it is determined that an eNB/cell which is more proper than the serving eNB/cell exists, or 3) the case 1) and the case 2) simultaneously and/or sequentially occur.

When the 'event' is triggered, the network or the serving cell requests to the UE for more detailed channel situation measurements and report, performs/commands serving cell change, or maintains the current state due to various network factors which is not recognized by the UE (e.g., traffic balancing).

FIG. 5 illustrates a problem of traditional cell selection method based on Rx power and also illustrates one exemplary embodiment of cell selection method according to the present invention.

In FIG. 5, vehicle performs measurement for a cell search reference signal from a cell 1 (c0) and reports a result to the c0, since the vehicle is close to the c0. However, when an obstacle exists between the vehicle and the c0, a link failure may happens since only one ray is received from the c0. On the contrary, a cell 2 (c1) can support a communication with various rays, even though the c1 cannot provide signals to the vehicle with high receiving power since the vehicle is far away from the c1. Thus, link between the vehicle can be stably maintained even the obstacle is present. When the vehicle moves in high speed, a cell selection should be performed by considering information with regard to the 'ray distribution'.

To generate proper Tx beams in a Tx end, channel information should be identified and a gain when generated beams are used should also be specifically measured. The channel information can be obtained by transmitting additional pilot signal from the Tx end to the Rx end. However, in current communication system, the Rx end measures channel and reports it back to Tx end in a format of Channel State Information (CSI). The channel information can be defined as a combination of sub-channels generated among a plurality of Tx/Rx antennas, and thus the Channel information gets more complex as the number of Tx/Rx antennas in MIMO system is increased.

Meanwhile, method for reporting the channel information can be divided into 1) explicit CSI reporting and 2) implicit Csi reporting. Explicit CSI reporting is a scheme that Rx end reports information as close as possible to the mreasured value without any interpreting the measured channel. In explicit CSI reporting, quantization for the MIMO channel and/or SVD (Singular Value Decomposition) operation are also applied to reduce signaling overhead.

Implicit CSI reporting is a scheme that Rx end reports information needed to generate beams at the Tx end instead of the measured channel, by interpreting the measured channel information itself. The implicit CSI reporting scheme is used in current mobile communication system because of the small signaling overhead required in CSI reporting.

According to large antenna array implemented as in-vehicle DAS, the vehicle can obtain high link stability and high data rate since high rank downlink transmission occurs with high probability than conventional personal mobile communication device. To support high rank downlink transmission, a plurality of transmission beams should be precisely controlled when the plurality of transmission beams are simultaneously transmitted. Since traditional standards are focused on transmission beam control with low rank transmission, there is a burden of correcting the current standard specifications.

Specifically, the current standard specifications should be changed in view of the followings:

1) when supporting high rank transmission/reception, more various beam masurement and generation should be supported (in current standards, one rank 8 precoder and 16 rank 2 precoders are defined)

2) user data rate (throughput) should be guaranteed even when a part of codeword fails to be transmitted and/or a part of connections is blocked, in case of a simultaneous transmission of a plurality of codeword (transport block)

To support the above-mentioned two points, new codebook should be newly defined, and structural of a downlink MIMO transmission end should also be changed to increase the number of codewords simultaneously transmitted. And, when a structure of a codebook which is used for CSI measurement for high rank transmission is changed, resources for CSi reporting are also increased. Thus, feedback overhead of other devices which do not need to perform high rank transmission also increases. Reduce on overall spectral efficiency or lack on capacity of uplink control channel should also be considered.

3. Virtual UE Scheme in DAS

Each of DUs of in-vehicle DAS structure is physically distributed apart from each other, and is designed to possess different radiation patterns according to its position of the vehicle due to a metal surface characteristics of the vehicle. And, by a reflect and a propagation at the metal surface, channels between eNB and each of the DUs have low correlation and are relatively independent than channels of conventional linear antenna array structure.

By using this, each of DUs or a part of DUs can be grouped so that grouped DUs operate as if they are one user equipment (or device) independent from other not-grouped DUs. That is, DUs belonging to one vehicle are reported to network entry as if they are one single independent UE, and high rank transmission/reception is performed through the one single independent UE. Hereinafter, the above-mentioned scheme is called 'virtual UE scheme', and the one single independent UE which consists of one or more DUs is called 'virtual UE (VUE)'. By designating the VUE, problems of standardization and implementation can be resolved and following advantages can be obtained at the same time.

1) By designating VUE, QoS management does not have to be performed for each of the DUs and can be controlled throughout one single bearer: some entry of the network but eNB (for example, MME, S-GW, etc) recognize the vehicle as one single user.

2) Multi-user channel is established between the eNB and the vehicle, and the eNB proceeds to control transmissions to each of DUs of the VUE and receptions of feedback from each of DUs of the VUE: other devices are not effected by the virtual UE scheme.

FIG. 6 is a diagram of detailed Tx beam control by introducing virtual User Equipment (VUE).

As can be seen from FIG. 6, DU0, DU1, DU2, and DU3 are designated as 4 VUEs of UE0, UE1, UE2, and UE3, respectively. Before considering virtual UE scheme, the vehicle is considered as one single UE by the eNB and only 8 different Tx beams can be used since only one rank 8 precoder is defined in codebook. On the contrary, as per the virtual UE scheme, 2 Tx beams can be allocated for each of 4 VUEs and one of 16 different Tx beam combinations can be selected and used for each of 4 VUEs.

FIG. 7 shows an exemplary embodiment of defining a plurality of virtual UEs and corresponding UE IDs. FIG. 7 shows a case that a vehicle is configured with 4 DUs and one CU connecting the 4 DUs.

The vehicle can define a VUE with a combination of one or more DUs. Each of VUEs can be configured with different combination of DUs and physical characteristics of each fo the VUE are configured differently each other. Or, each of VUEs can be configured to share one or more DUs so that Multiple Access Interference (MAI) caused by MU-MIMO access can be efficiently controlled. Or, each of VUEs can be configured to include different number of DUs, thereby Rx performance/complexity can be set differently for the each of VUEs. And, specific combinations of DUs (i.e., specific VUE) can be registered as a default user.

Here, one VUE can be differed from other VUEs in at least one of physical layer ID, cell specific UE ID (RNTI), and Rx antenna indication, etc. That is, different indication is allocated for each of VUEs so that eNB or a part of entry of a network recognizes the differences between target (or, destination) of data transmission.

4. Proposed Method for Accessing a Network in DAS

Hereinafter, proposed method for accessing a network in DAS by using aforementioned virtual UE scheme is described. In proposed embodiment, 'subtantive UE (SUE)' is introduced. When a plurality of VUEs are registered/connected to a network, only a part of network entry, for example eNB or MME, can individually recognize the plurality of VUEs. On the contrary, other network entries does not recognizes VUEs but are merely aware of the 'substantive UE'. In other words, the proposed accessing method can be understood as an accessing method by 'network transparent UEs'.

The 'SUE' can be defined as one of the followings:
1) UE defined with one global UE ID
2) UE performing communication to provide one single service 3) UE firstly established connection with the network among different combinations of DUs
4) UE recognized as one single device by network entries (except for eNB or MME, which are aware that virtual UE scheme is applied)

On the contrary, 'VUE' should be understood as one combination including one or more DUs and establishing a conenction with eNB through additional accessing process (e.g., random access procedure or RACH procedure). By allowing the substantive UE to add/register connections of a plurality of UEs (which are VUEs), the proposed embodiment can guarantee the vehicle with high-end performance, such as high rank transmission, increased number of simultaneous codewords transmission, enhanced degree of freedom for scheduling (resource allocation), etc.

To support the vehicle with high rank transmission by using virtual UE scheme without enfluencing operation of current mobile communication system supporting conventional devices, network registration of VUEs and communication process via VUEs which are not effecting conventional network configurations are described.

FIG. 8 is a block diagram of a device supporting a virtual UE scheme.

One exemplary embodiment for a device supporting the aforementioned virtual UE scheme is shown in FIG. 8. In FIG. 8, the device (or, user equipment) consists of one CU determining control information to be transmitted to eNB and way to transmit the control information and a plurality of DUs receiving downlink signal from the eNB. Further, the device may include one or more modem which firstly demodulate the received downlink signal by the DUs, and a connection between the DUs and the modem can be fixed (e.g., left side of FIG. 8) or floating (e.g., right side of FIG. 8). CU does not generate control information only, but also performs higher layer process than physical layer (e.g., reconstructing serving packets of the received signals, processing applications, etc.) Each of DUs are not mere antenna, but may perform decoding process, MIMO process, and CSI measurement/reporting process, etc.

FIGS. 9 and 10 show exemplary embodiments of method for accessing a network by using virtual UE scheme of a device.

UE of FIG. 9 requests access of a plurality of users to eNB, by performing multiple RACH procedures (or random access procedures). Here, the UE firstly requesting access of itself to the eNB should be considered as 'SUE', and any additional UE requesting access to the eNB afteron should be considered as 'VUE'.

As the UE receives cell search reference signal (RS) from the eNB (S910), the UE performs cell search (or, cell detection) (S920). After the cell search process, the UE synchronizes with the eNB and performs measurement to the eNB by using received channel estimation RS (S930), so that the UE is ready to receive system information from the eNB which is a provisionally selected serving cell for the UE. And, as the UE acknowledges characteristics of the eNB (or cell) by receiving system information from the eNB (S940), the UE determines the number of access requests to be performed to the eNB by using the virtual UE scheme (S950). The number of access requests to be performed might be determined when multiple access procedures are determined to be needed due to lack of the number of transmission antennas.

And, the UE performs access request procedures for the number determined in S950 (S960 to S990). For example, when the UE confirms that the eNB is a legacy eNB by receiving the system information and two access procedures are required to support high rank transmission and multiple codeword Tx/Rx, the UE performs two access request procedures to establish two different connections with the eNB. Here, one user establishing a connection with the eNB firstly through the first access request procedure (S960, S970) is called SUE, and another user establishing another connection with the eNB through the second access request procedure (S980, S990) is called VUE. That is, two different DU groups establish connections with the eNB independent from each other.

In one exemplary embodiment, when UE transmits multiple access requests to the eNB, the access procedures should be performed in a way to avoid contention. For example, for a case that access procedures are performed by using RACH (Random Access CHannel) processes, two RACH processes should be distinguished to each other to avoid potential contentions. Specifically, upon receiving the system information from the eNB, the UE may identify RACH preamble sequences which are available to the eNB. And, the UE may select two RACH preamble sequences from the available sequences and allocate the two sequences for each of the two RACH processes respectively. The UE may randomly select the two sequences or an index for one sequence can be obtained by adding certain factor 'i' to an index for another randomly-selected sequence. In general meanings, the procedure for selecting the sequences may be understood as allocating physical resources used in RACH process. That is, selecting two different sequences may be understood as allocating two different physical resources for each of two RACH processes.

In view of the eNB, the eNB detects resources (sequence, time slot) used for RACH processes and recognizes the two different access requests from the UE. The eNB allocates unique UE ID, which is C-RNTI (Cell Radio Network Temporary Identifier) for example, for each of the UE (SUE/VUE). Since the RACH processes were performed by using different RACH preamble sequences and/or resources, no contention is occurred and the eNB can identify the two different RACH processes.

In another exemplary embodiment, the UE may perform any additional access request procedure while the UE is connected with the eNB. That is, the UE may determine that additional connection is need to be added to support higher rank transmission, increased simultaneous codewords transmission, etc. Then, the UE may perform additional access request procedures to add connections with the eNB. In other words, SUE may request the eNB to establish additional connection with one or more VUEs.

The UE may transmit multiple access requests to the eNB, not only for initial access but also after the initial access and/or while communicating with the eNB. When the UE determines to add connections with the eNB, uplink transmission power may also be considered while determining the number of additional connections. As the additional access request procedures are performed, the eNB may allocate new UE IDs for the additional connections via VUEs.

In another exemplary embodiment, the UE may perform the multile access request procedures simultaneously. As can be seen from FIG. 10, the UE may perform RACH processes by transmitting two different RACH preamble sequences 1, 2 to the eNB at the same time (S1010, S1020). Of course, the UE should use different RACH preamble sequences for the two different access request procedures, and the UE should also use different RACH resources to avoid any contentions. The eNB allocates two different UE IDs for the two different RACH processes (S1030), and notifies the UE with the allocated two UE IDs (S1040). In this case, one identified UE ID is allocated for SUE and another identified UE ID is allocated for VUE, since two RACH procedures are simultaneously performed.

FIG. 11 is a diagram for a bearer configuration when the virtual UE scheme is applied.

When network entries including eNB recognize the UE requesting for connection establishment is a VUE under virtual UE scheme, the VUE is connected with the network through preconfigured connection of a SUE while not requesting a new bearer configuration for the VUE to the upper network entries. That is, the bearer which is already configured for the SUE is shared with the VUE.

As an initial connection is established between the eNB and SUE, each of network entries sets up logical paths for the SUE. This scheme supporting data flow through organized configuration is called 'packet define network'. As per the proposed virtual UE scheme, eNB among the network entries distinguish SUE/VUE independently to control radio links of the SUE/VUE. However, other network entries but the eNB recognize the SUE/VUE as one single UE. As can be seen from FIG. 10, when eNB which is able to distinguish VUE from SUE recognize the access requested VUE, the eNB shares preconfigured bearer of the SUE. Here, a global ID is common between the SUE and the VUE, while the UE ID is different between the SUE and the VUE.

FIGS. 12A and 12B show exemplary embodiments of method for accessing a network by using virtual UE scheme of a device.

When virtual UE scheme is applied, UE notifies the eNB and corresponding network entries that the UE itself requesting a access request procedure is a VUE. To provide common QoS management by sharing same bearer between SUE and VUEs, specific network entry should be able to distinguish the VUEs from the SUE. As mentioned before, the specific network entry might be eNB. Thus, when a connection establishment is requested, the requesting SUE notifies the specific network entry that the connection establishment is for a VUE. Or, to avoid enfluencing current mobile communication system, the notification procedure may be performed by the VUE requesting the connection establishment.

In FIG. 12A, an initial access request is performed between UE and eNB (S1210, S1215, S1220). Throughout the access request procedure, the UE notifies the eNB that the UE itself is a VUE and no additional bearer is need to be configured for the UE (S1225). This notifying procedure may be performed through connection (RRC) configuaration request procedure. By receiving the connection configuration request message from the UE, the eNB identifies the VUE and determines to share the bearer of the SUE with the VUE (S1230). By confirming the VUE that the VUE is identified by the eNB (S1235) and receiving acknowledment from the VUE (S1240), the eNB directly share preconfigured bearer for the VUE (S1245). Of course, procedure for configuring a new bearer is ommitted in here.

In FIG. 12B, differently from FIG. 12A, the UE notifies that the UE itself is a VUE to the eNB, after a new connection is configured (S1275). Other procedures may be operated similarly to the procedures of FIG. 12A.

FIGS. 13A, 13B, 13C and 14D show exemplary embodiments of message configurations when virtual UE scheme is applied. Here, exemplary embodiments for notifying the virtual UE scheme to network entries are described.

When access is requested by a VUE, a cause/reason for the access request may be notified to the network by indicating that the access request is for a virtual UE scheme.

Specifically, it can be implemented by transmitting information indicating 'virtual UE scheme' included in 'establishment cause' field of the access/connection request message of the current communication system. Alternatively, UE ID (e.g., C-RNTI, MME unique ID, global ID, etc.) of a SUE may be reported to indicate whose bearer is requested to be share with the VUE.

FIG. 13A shows an example of a message configuration used in access/connection request procedures. It can be seen from FIG. 13A that 'establishment cause' field of a connection request message includes information indicating 'virtual UE comunication' (S1310). Also, 'UE ID' field of the message includes UE ID information of one or more grouped DUs consisting the VUE.

FIG. 13B shows another example of a message configuration transmitted to the eNB. In FIG. 13B, 'UE ID of UEs which share bearer' field (S1320) is added to the structure of FIG. 13A. That is, by transmitting UE ID of a SUE whose bearer is requested to be shared, the VUE is also able to notify the eNB that virtual UE scheme is applied. When the SUE's UE ID is transmitted to the eNB, the information indicating the 'virtual UE scheme' of the 'establishment cause' field (1330) may be ommitted.

FIG. 13C and FIG. 13D show example configurations of another message transmitted from the VUE to the eNB. The messages structures of FIG. 13C and FIG. 13D may correspond to the message S1275 of FIG. 12B.

Unlike the previous embodiments, the notification of the virtual UE scheme may be transmitted to the eNB after the connection has been established between the VUE and the eNB, since it is not essential for the eNB and corresponding network entries to know that proceeding connection request is for a VUE. Thus, the notification (S1340) may be performed through a upper layer signaling that identifing a complete of the connection establishment. For example, RRC connection complete message of the current communication system may be used for this embodiment.

In FIG. 13D, to ease burden of the eNB, the notification process is performed to upper network entry, not to the eNB. That is, upper network entry which is directly involved with a bearer configuration may be notified that the connection establishment process has been performed for a VUE through a virtual UE process, since the eNB is not directly involved to a configuration of a bearer. In this embodiment, a message which is not targeted to a eNB but is targeted to a upper network entry is used, for example NAS message of the current communication system. That is, higher entry information field of the message may include information indicating virtual UE scheme is applied (S1350).

FIG. 14 shows exemplary embodiments of method for accessing a network by using virtual UE scheme of a device.

In another exemplary embodiment, a virtual UE scheme which requires no additional signaling for the UE may be applied to reduce impact on the UE. In this embodiment, the UE does not transmit any information with regard to the virtual UE scheme to the eNB. Instead, upper network entry which collects and analyzes UE IDs recognizes the UE ID of the VUE and identifies the applied virtual UE scheme. Thereby, bearer sharing may be configured by the upper network entry.

For example, when the connection has been established between VUE and the eNB (S1410 to S1435), the eNB reports the UE ID to MME which possessing information of UE IDs and UE characteristics and requests identification and authentication to the MME (S1440). The MME (or other upper network entry) checks the UE ID of the VUE and corresponding network characteristics and identifies whether the VUE supports virtual UE scheme or not (S1445). As the VUE is identified to support the virtual UE scheme, the MME checks any preconfigured bearer which can be shared with the VUE (S1450). If there is any available preconfigured bearer, the MME applies the preconfigured bearer for the VUE without generating any new bearer (S1455), and notifies the eNB of PDN connection has been completed (S1460).

5. Device configuration

FIG. 15 is a block diagram for a user equipment and a eNB in accordance with the present invention.

In FIG. 15, a user equipment 100 and a eNB 200 can include a radio frequency (RF) unit 110/210, a processor 120/220 and a memory 130/230, respectively. Although FIG. 15 shows one-to-one communication environment between the user equipment 100 and the eNB 200, communication environment can be constructed between a plurality of user equipment and the eNB 200. And, the eNB 200 depicted in FIG. 15 can be applied to both a macro cell eNB and a small cell eNB.

Each of the RF units 110/210 can include a transmission unit 111/211 and a reception unit 112/212, respectively. The transmission unit 111 and the reception unit 112 of the user equipment 100 are configured to transmit and receive a signal with the eNB 200 and different user equipments. The processor 120 is functionally connected with the transmission unit 111 and the reception unit 112 and is configured to control the transmission unit 111 and the reception unit 112 to transmit and receive signal with different devices. And, the processor 120 performs various processing on a signal to be transmitted and transmits the signal to the transmission unit 111. The processor performs processing on a signal received by the reception unit 112.

If necessary, the processor 120 can store information included in an exchanged message in the memory 130. The user equipment 100 can perform the aforementioned various embodiments of the present invention with the above-mentioned structure.

The transmission unit 211 and the reception unit 212 of the eNB 200 are configured to transmit and receive a signal with a different eNB and user equipments. The processor 220 is functionally connected with the transmission unit 211 and the reception unit 212 and is configured to control the transmission unit 211 and the reception unit 211 to transmit and receive signal with different devices. And, the processor 220 performs various processing on a signal to be transmitted and transmits the signal to the transmission unit 211. The processor performs processing on a signal received by the reception unit 212. If necessary, the processor 220 can store information included in an exchanged message in the memory 230. The eNB 200 can perform the aforementioned various embodiments of the present invention with the above-mentioned structure.

Each of the processors 120/220 of the user equipment 100 and the eNB 200 indicates (e.g., control, adjust, manage) operations in the user equipment 100 and the eNB 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof. In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method of communicating with a cell by a user equipment (UE), the method comprising:
   receiving system information on the cell by performing a cell search;
   determining a number of distributed antenna units, for accessing the cell, based on the system information on the cell,
   wherein the UE comprises a plurality of distributed antenna units;
   performing, respectively, a random access procedure for each of the determined number of distributed antenna units with respect to the cell, based on different random access resources; and
   communicating with the cell via the determined number of distributed antenna units,
   wherein an identical radio bearer is configured for the determined number of distributed antenna units.

2. The method according to claim 1, wherein the random access procedure, for each of the determined number of distributed antenna units, are performed based on different random access preamble sequences, respectively.

3. The method according to claim 2, wherein the different random access preamble sequences are selected randomly among a plurality of available sequences, or
   wherein one random access preamble sequence among the different preamble sequences is selected randomly among the plurality of available sequences and remaining random access preamble sequences are selected by applying a predetermined value to an index for the one random access preamble sequence.

4. The method according to claim 1, further comprising:
   receiving a message notifying different UE IDs allocated for each of the determined number of distributed antenna units, respectively.

5. The method according to claim 1, further comprising:
   transmitting a signal informing that the determined number of distributed antenna units are associated with the UE.

6. The method according to claim 1, wherein the plurality of distributed antenna units are distributed in connection with each other over a vehicle and are connected to a central unit (CU).

7. A user equipment (UE) for communicating with a cell, the UE comprising:
   a transmitter;
   a receiver; and
   a processor, operatively coupled to the transmitter and the receiver,
   wherein the processor is configured to:
   control the receiver to receive system information on the cell by performing a cell search;
   determine a number of distributed antenna units, for accessing the cell, based on the system information on the cell,
   wherein the UE comprises a plurality of distributed antenna units;
   perform, respectively, a random access procedure for each of the determined number of distributed antenna units with respect to the cell, based on different random access resources; and
   communicate with the cell via the determined number of distributed antenna units, wherein an identical radio bearer is configured for the determined number of distributed antenna units.

* * * * *